US008548259B2

(12) United States Patent
Tuganbaev

(10) Patent No.: US 8,548,259 B2
(45) Date of Patent: Oct. 1, 2013

(54) CLASSIFIER COMBINATION FOR OPTICAL CHARACTER RECOGNITION SYSTEMS UTILIZING NORMALIZED WEIGHTS AND SAMPLES OF CHARACTERS

(71) Applicant: ABBYY Software Ltd., Nicosia (CY)

(72) Inventor: Diar Tuganbaev, Late of Moscow (RU)

(73) Assignee: ABBYY Development LLC, Moscow (RU)

( * ) Notice: Subject to any disclaimer, the term of this patent is extended or adjusted under 35 U.S.C. 154(b) by 0 days.

(21) Appl. No.: 13/659,289

(22) Filed: Oct. 24, 2012

(65) Prior Publication Data

US 2013/0044943 A1 Feb. 21, 2013

Related U.S. Application Data

(63) Continuation of application No. 12/775,445, filed on May 6, 2010.

(51) Int. Cl.
*G06K 9/62* (2006.01)
*G06K 9/68* (2006.01)

(52) U.S. Cl.
USPC ............ 382/224; 382/159; 382/161; 382/220

(58) Field of Classification Search
None
See application file for complete search history.

(56) References Cited

U.S. PATENT DOCUMENTS

| | | | |
|---|---|---|---|
| 5,140,538 A * | 8/1992 | Bass et al. .......................... 708/3 |
| 5,625,707 A * | 4/1997 | Diep et al. ..................... 382/157 |
| 5,708,727 A * | 1/1998 | Tanaka et al. .................. 382/156 |
| 5,825,925 A | 10/1998 | Baird et al. |
| 5,835,633 A * | 11/1998 | Fujisaki et al. ................ 382/187 |
| 5,970,171 A | 10/1999 | Baraghimian et al. |
| 6,501,855 B1 * | 12/2002 | Zelinski ......................... 382/186 |
| 6,628,808 B1 * | 9/2003 | Bach et al. ..................... 382/115 |
| 6,671,391 B1 * | 12/2003 | Zhang et al. ................... 382/118 |
| 7,024,033 B2 | 4/2006 | Li et al. |
| 7,031,530 B2 * | 4/2006 | Driggs et al. .................. 382/228 |
| 7,184,591 B2 * | 2/2007 | Thiesson et al. .............. 382/186 |
| 7,313,267 B2 | 12/2007 | Call et al. |
| 7,343,362 B1 | 3/2008 | Flippen |
| 7,362,892 B2 | 4/2008 | Lewis et al. |
| 7,454,062 B2 | 11/2008 | Nishiyama et al. |
| 7,519,217 B2 | 4/2009 | Liu et al. |
| 7,529,403 B2 | 5/2009 | Ivanov |
| 7,558,426 B2 | 7/2009 | Katoh et al. |
| 7,570,816 B2 | 8/2009 | Bargeron et al. |
| 7,840,076 B2 * | 11/2010 | Bouguet et al. ................ 382/224 |
| 8,055,078 B2 * | 11/2011 | Choi et al. ..................... 382/209 |
| 8,155,399 B2 * | 4/2012 | Liu et al. ........................ 382/118 |
| 8,194,933 B2 * | 6/2012 | Lei et al. ........................ 382/112 |
| 8,213,725 B2 * | 7/2012 | Loui et al. ..................... 382/224 |
| 8,315,465 B1 * | 11/2012 | Baluja et al. .................. 382/224 |
| 8,320,674 B2 * | 11/2012 | Guillou et al. ................. 382/179 |
| 8,335,381 B2 * | 12/2012 | Rodriguez Serrano et al. ............................ 382/186 |
| 2002/0159642 A1 * | 10/2002 | Whitney ........................ 382/225 |
| 2005/0220336 A1 * | 10/2005 | Sabe et al. ..................... 382/159 |
| 2005/0286772 A1 * | 12/2005 | Albertelli ...................... 382/224 |
| 2009/0285473 A1 * | 11/2009 | Li et al. ......................... 382/159 |

* cited by examiner

*Primary Examiner* — Matthew Bella
*Assistant Examiner* — Thomas Conway
(74) *Attorney, Agent, or Firm* — LeighAnn Weiland; Aditya Krishnan

(57) ABSTRACT

Techniques and methods are disclosed herein for combining and weighting of values from and associated with classifiers. Classifiers are used to recognize characters as part of an optical character recognition (OCR) system. Various methods of normalization facilitate combining of results of classifiers. For example, weight values may be entered into a weight table having two columns, one that includes weights from comparing patterns with images of correct characters, the other column includes weights from comparing patterns with images of incorrect characters.

19 Claims, 10 Drawing Sheets

CLASSIFIER COMBINATION FOR OPTICAL CHARACTER RECOGNITION SYSTEMS UTILIZING NORMALIZED WEIGHTS AND SAMPLES OF CHARACTERS

CROSS-REFERENCE TO RELATED APPLICATIONS

For purposes of the USPTO extra-statutory requirements, the present application constitutes a continuation of U.S. patent application Ser. No. 12/775,445 that was preliminarily titled IMPROVING THE ACCURACY OF RECOGNITION BY MEANS OF A COMBINATION OF CLASSIFIERS that was filed on or about 6 May 2010, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, *Benefit of Prior-Filed Application*, USPTO Official Gazette 18 March 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

The present disclosure relates to optical character recognition of printed, hand-printed, and hand-written characters.

2. Related Art

Optical Character Recognition (OCR) systems are widely used. In an OCR system, as most errors occur at a character recognition stage, accuracy of recognition of individual characters is a pivotal factor. In order to achieve greater OCR accuracy, the number of errors in recognizing individual characters must be minimized.

To achieve better recognition accuracy, several different classifiers are used. Each classifier has its own set of ratings and scales. In an OCR system, different classifiers can be of all characters and estimate how much an image is similar to known characters or if it is present. These classifiers may include a raster classifier, a feature classifier, a structure classifier, etc. In order to recognize a character image, a classifier compares the image with a set of patterns. Generally, each classifier has its own set of character patterns. A pattern is a template of some character for a classifier. A classifier compares an image of unknown character with the set of patterns dissimilar to one or another character. In fact, a classifier may have several patterns for a single character.

For instance, there may be several patterns for character "a" like "a" from a first font, "a" from a second font, etc. A classifier compares an image with the whole group of patterns for the character "a" but chooses the best coincidence (matching) one and further takes into account only the one weight which was obtained for this best variant. The same process is performed with pattern groups of all others characters. Then only the best weights of each of the pattern groups are compared with each other to find out which character is represented in the image. Therefore, when it is a matter of weight, a weight obtained by comparing an image with a pattern of some character, it is actually the best weight of the pattern group for that character.

Patterns are obtained by processing character images from a training image database. Such database contains real images of different characters, which were selected for training a classifier. An example of an image from such a database usually is referred to a learning sample or sample image. The training image database also may be used for different methods for improving the quality of recognition, including training, such as by combining different values and using a weighting scheme. The improvements may be made for a variety of classifiers. But in these cases, it is useful to employ another database, more specifically a database with images dissimilar to the ones on which the patterns were trained.

A raster classifier compares a character image with a pattern by superimposing an image of the character on an image of its pattern. A degree of discrepancy is expressed by a number of differing pixels. To achieve an acceptable degree of accuracy with a raster classifier, the image can be pre-processed. Specifically, a size, a slant and a stroke width of the image can be normalized. For example, all character images can be reduced to a same size such as a character that is 14×14 pixels. Patterns for each class of character are typically obtained by averaging the images of the corresponding character in a learning sample on which the raster classifier is trained. The raster classifier is easy to implement, works fast, and has a good tolerance for image defects. However, the accuracy of raster classifiers is relatively low. Another drawback of typical raster classifiers is its high sensitivity to changes in shape of characters.

A feature classifier operates on the following principles. The features of a source image are computed and the image is converted into an N-dimensional feature vector. A type and a number of features are the most important characteristics that determine quality of results obtained with the feature classifier. Next, the feature vector is compared with a set of pattern feature vectors. The comparison of each pair of feature vectors consists in computing a rating that describes a distance between points in an N-dimensional space, where a point is a geometrical representation of a feature vector. The major advantages of the feature classifier are the ease of implementation, good capability to make generalizations, good tolerance for changes in character shapes, low number of recognition failures, and high speed. A major disadvantage of the feature classifier is low tolerance of various image defects. Additionally, the features are computed independently, which results in loss of information about mutual positioning of the character elements. Feature classifier is a general name for a plurality of different classifiers, each using its own set of features.

A contour classifier is a kind of feature classifier. To extract character features, a contour classifier uses contours (boundaries) that have been identified in each character image. Its operational principles, advantages, and disadvantages are the same as those of a feature classifier.

A structure classifier uses man-made character structural models, against which an image being recognized is compared. A character in a structure classifier is described by a set of structural elements such as a line, an arc, a circle and a dot. Allowed mutual positioning of the elements is defined by means of geometric relations such as a line angle, a length, an intersection of lines, and the like. Variables used in relations are attributes (e.g., length restriction, range of angles, deviation from a direct line) and coordinates of characteristic character points, such as ends and extrema. A pattern specifies ranges of allowed values for the attributes of each structural element. In case of a line, for example, the range of possible angles and a maximum deviation from the straight line are specified. The relations are specified by means of fuzzy logical expressions. Structural character descriptions are characterized by a high degree of generalization and can achieve high recognition accuracy even for highly variable characters, which is particularly important in the case of hand-printed and hand-written characters.

Each classifier has its own set of ratings and features. This leads to a problem of combining the ratings obtained from the different classifiers. A further problem lies in obtaining a qualitative assessment of the recognizer. Specifically, the following problems may arise when combining classifiers: a) Different classifiers may have different quantitative scales. For example, a raster classifier may produce ratings on a scale from to 0 to 400 and a contour classifier may have a scale from 0 to 800. In this case, how would one compute an overall rating? b) Each classifier will recognize some characters better and some characters worse, which, in turn, may be successfully recognized by another classifier. How would these factors take into account when combining several classifiers? c) Disagreement among quantitative scales that were obtained for different characters from the same classifier. Specifically, in case of difficulty in distinguishing pairs of characters, for example, "t" and "f", "e" and "c", "z" and "2", a 30% match with the pattern, especially for hand-written characters, is considered a fairly good result which allows the classifier to reliably recognize the character. On the other hand, for simple characters ("x", "7", "A"), 30% is very low and, most likely, means that the character has been recognized incorrectly. For simple characters, a 70-80% match is considered a good result. Another problem is that one extra pixel for character A may mean something completely different than one extra pixel for character B.

DETAILED DESCRIPTION

Before describing in detail embodiments that are in accordance with the present disclosure, it should be observed that the embodiments reside primarily in combinations of method steps and system components related to combining different classifiers used as part of or used in an optical character recognition (OCR) system.

As used herein, relational terms such as first and second, and the like may be used solely to distinguish one module or action from another module or action without necessarily requiring or implying any actual such relationship or order between such modules or actions. The terms "comprises," "comprising," or any other variation thereof, are intended to cover a non-exclusive inclusion, such that a process, method, article, or apparatus that comprises a list of elements that does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Advantageously, the present disclosure provides a method and a system to combine several different classifiers to improve accuracy of an OCR system. Specifically, several classifiers are combined to benefit from advantages and characteristics of different classifiers. The proposed method is not in any way based on the operational principles of one or another classifier and therefore can be used to combine the ratings obtained with any type of classifiers.

Before the classifiers are combined, the classifiers are trained. Classifier training is a procedure of selecting classifier parameters on a basis of a training database of images so as to minimize the chances of a wrong decision. Particularly, it is selecting parameters for classifier character patterns, or training patterns. In the present disclosure it is assumed that all classifiers and patterns have already been trained by any known process. The described method is employed for weight combining training, where weights were obtained from different classifiers. The described method is also employed after training for identifying these weights with a combined weight.

Figure 1:
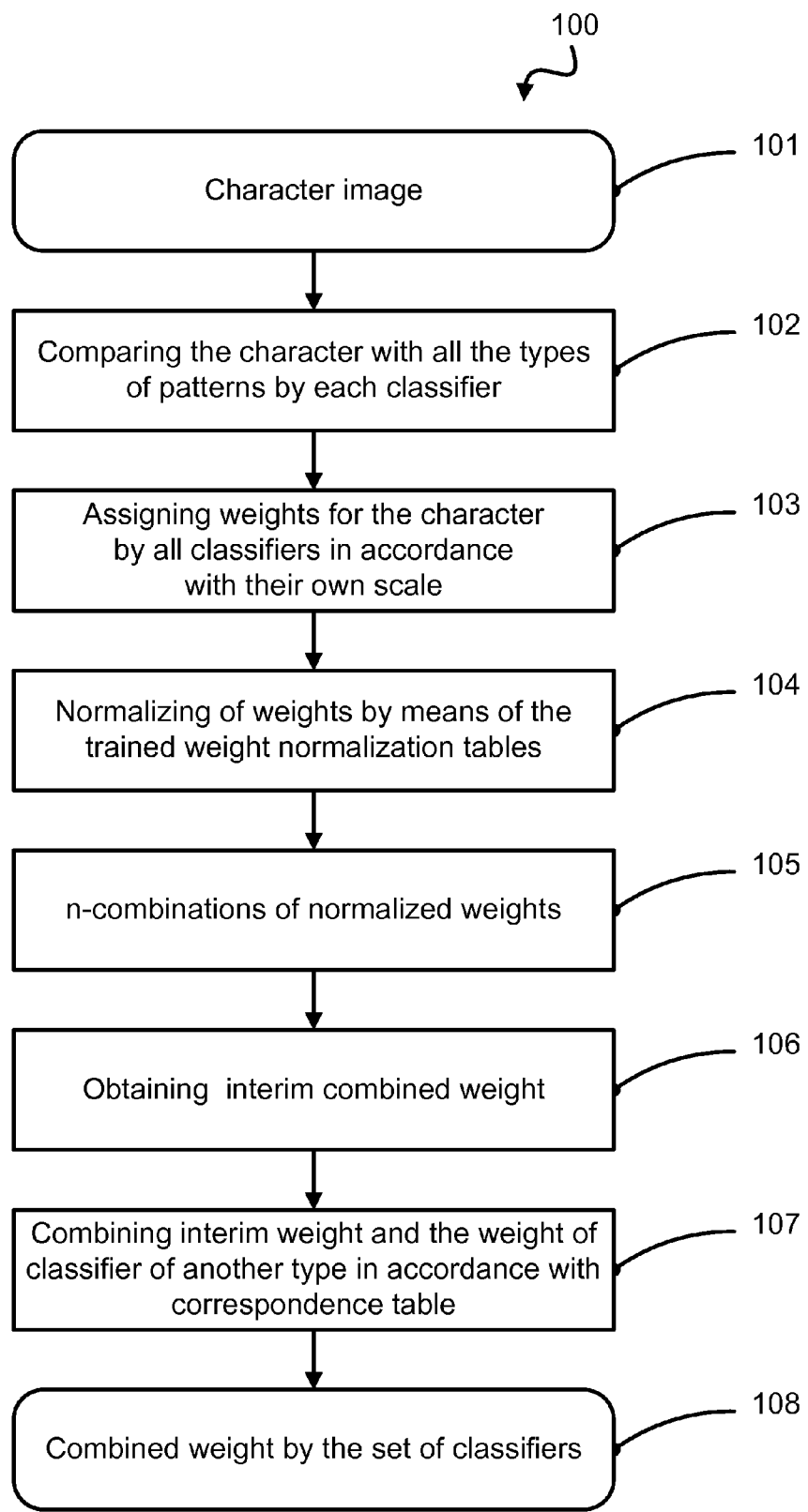
FIG. 1 shows a flowchart of a method of obtaining a combined weight of classifiers after combination of training, in accordance with an embodiment of the present disclosure.

FIG. 1 is a block diagram of obtaining a combined weight of several classifiers for character image in a recognition process, in accordance with one embodiment. But, before starting recognition using a combined weight scheme, the system should be trained to combine classifiers or classifier ratings.

When obtaining a combined rating from a group of classifiers, a problem of different quantitative scales arises. For this reason, in the present disclosure, in one embodiment all ratings may be first reduced to a single scale, or are first normalized. Normalization makes combining of classifier results easier, particularly in conjunction with the step of selecting coefficients at step 603 of FIG. 6. However it is to be understood that normalization is an optional step when using multiple classifiers. For normalization, a scale from 0 to 1 may be used. However any other scale that is convenient may be used. Each classifier assigns a "normalized weight" to each character image, to replace a rating given to the image in accordance with the classifier's own scale. Therefore, it is to be understood that in this embodiment, the lower the normalized weight, the better the character image matches the pattern. However, the method can also use reverse weights, which would mean that worse the image, the lower the normalized weight.

Figure 2:
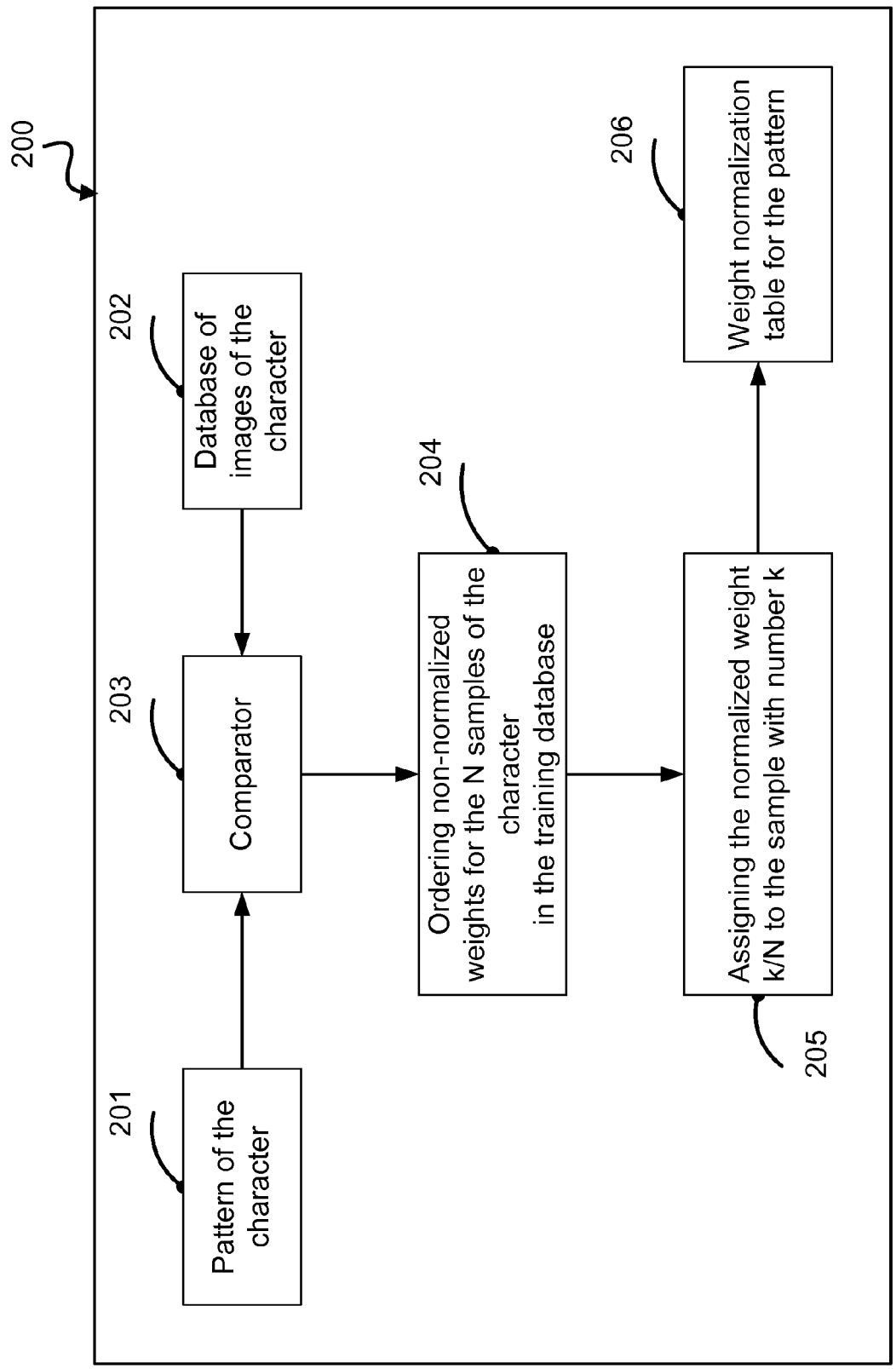
FIG. 2 shows block diagram illustrating training a weight normalization table or scheme, in accordance with an embodiment of the present disclosure.

In one embodiment, shown in FIG. 2, the weight for normalization of a certain pattern may be implemented on a basis of images of the same character. The normalized weight shows the place of a sample image among the other images of the same character in the image database (202). If the scale from 0 to 1 is used and there are N samples in the training image database (202) representing a single character corresponding to a pattern (201), then the images are ordered (204) according to decreasing non-normalized weights, and the normalized weight k/N is assigned to the sample corresponding to number k. Thereby a normalized weight of 0 is assigned (205) to the best image in the database (or the image identical to the best image), whereas a weight of 1 is assigned to the worst image. An "average" image, therefore, will generally have a weight of 0.5. Training module 200 is employed for each pattern individually for all classifiers. This method of normalization is fast and easy. But, there are other, more complex methods of normalization.

Figure 3:
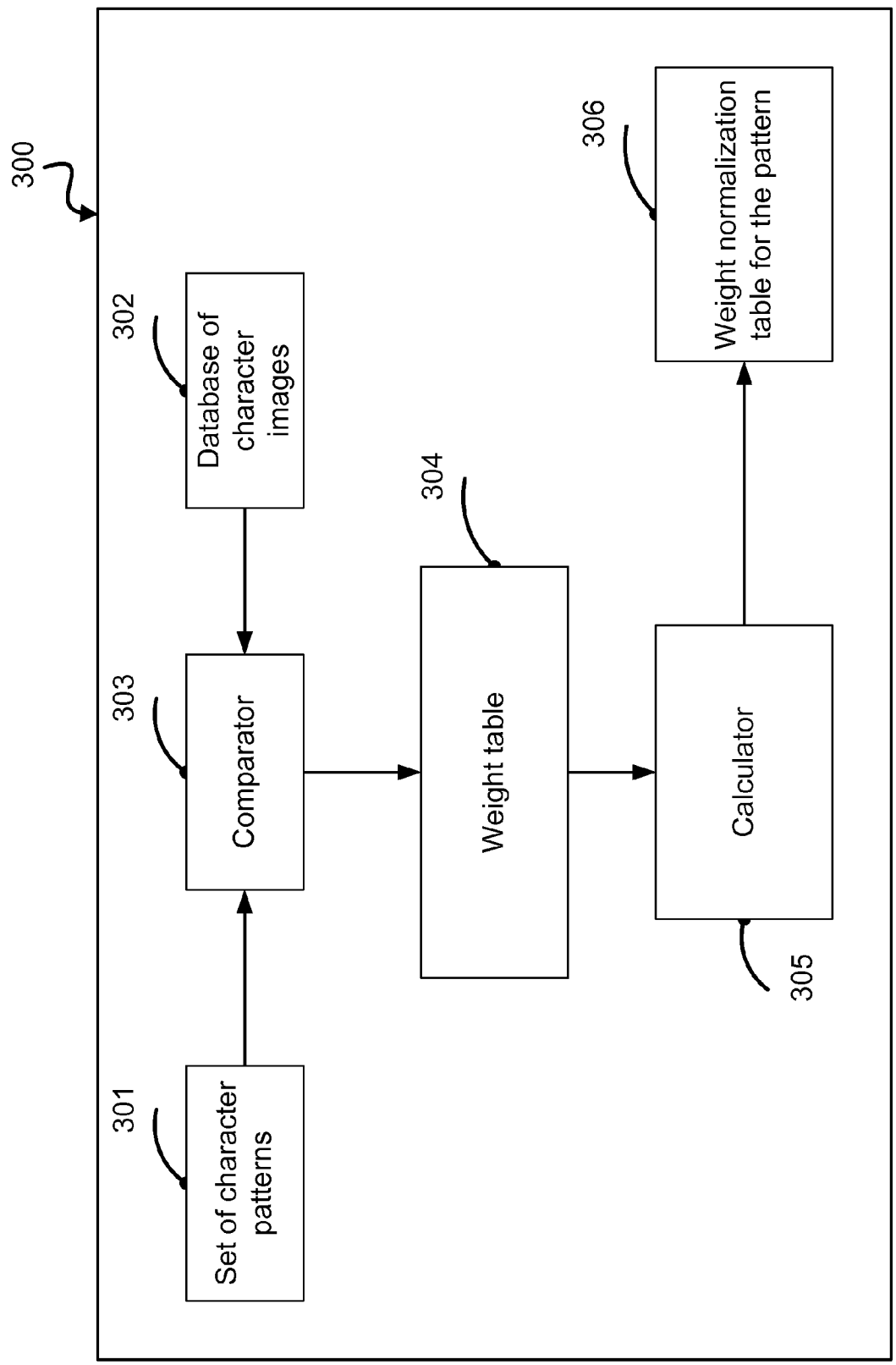
FIG. 3 shows block diagram illustrating another method of training a weight normalization scheme or table, in accordance with an embodiment of the present disclosure.

The above-described method of normalization is fast and easy. But, there are the other, more complex methods of normalization. For example, FIG. 3 shows a block diagram of a weight normalization table training module 300 that implements a more complex normalization procedure. The normalization training module 300 uses a set of trained patterns 301 and a database 302 of character images. The database 302 include images for all possible characters, and during training the system "knows" which pattern from the set 301 corresponds to which character images from the database 302. The quality of recognition or the ability to recognize a character becomes apparent only when one tests how well a classifier can distinguish a character from the other characters. When tests are done on a single character, the classifier only rates the quality of the images. Advantageously, in one embodiment, to assess the quality of recognition of a character, both "right" and "wrong" images are used to establish how well the classifier can distinguish right images between all others, as will be described.

In the present embodiment, based on a comparator's (303) output, the classifier assigns weight values according to its own scale—as shown in FIG. 3. Specifically, all weight values are obtained when recognizing the images from the database 302 based on the patterns 301. Weight values are entered into a weight table or scheme 304 such as one having two columns: one column includes weights obtained by comparing the patterns with the images of the right characters, the other column includes weights obtained by comparing the patterns with the images of the wrong characters. This procedure is reiterated for each pattern to obtain for each pattern its own weight normalization table.

After the weight values are assigned, for each weight value (q) in both columns (for right and wrong images) of the table, the number of samples with weight less than or equal to the weight value (q) is calculated. The number of samples in the column of the right images (m) and the wrong images (k) is calculated using calculator module 305. Subsequently, a normalized weight (p) is calculated, where $$p = \frac{k}{m+k}.$$

From these correspondences between the normalized weights and weight values on the classifier's own scale, a weight normalization table 306 is built. The weight normalization table 306 is built separately for each character pattern. In one embodiment, normalized weights are assigned by applying the weight normalization table 306 to weights based on the classifier's own scale. To factor in recognition peculiarities shown by different classifiers on different characters, the weight normalization table 306 is always built and trained separately for each character used by the classifier. Training is done separately for each classifier.

To make the weights of different characters comparable, it is determined which weight values of the given classifier more often correspond to correctly recognized characters and which weight values more often correspond to incorrectly recognized characters. In one implementation, each classifier is trained and tested with a large corpus or collection of characters. During recognition training, statistics are gathered as much as possible for the weight values that were obtained.

Figure 4:
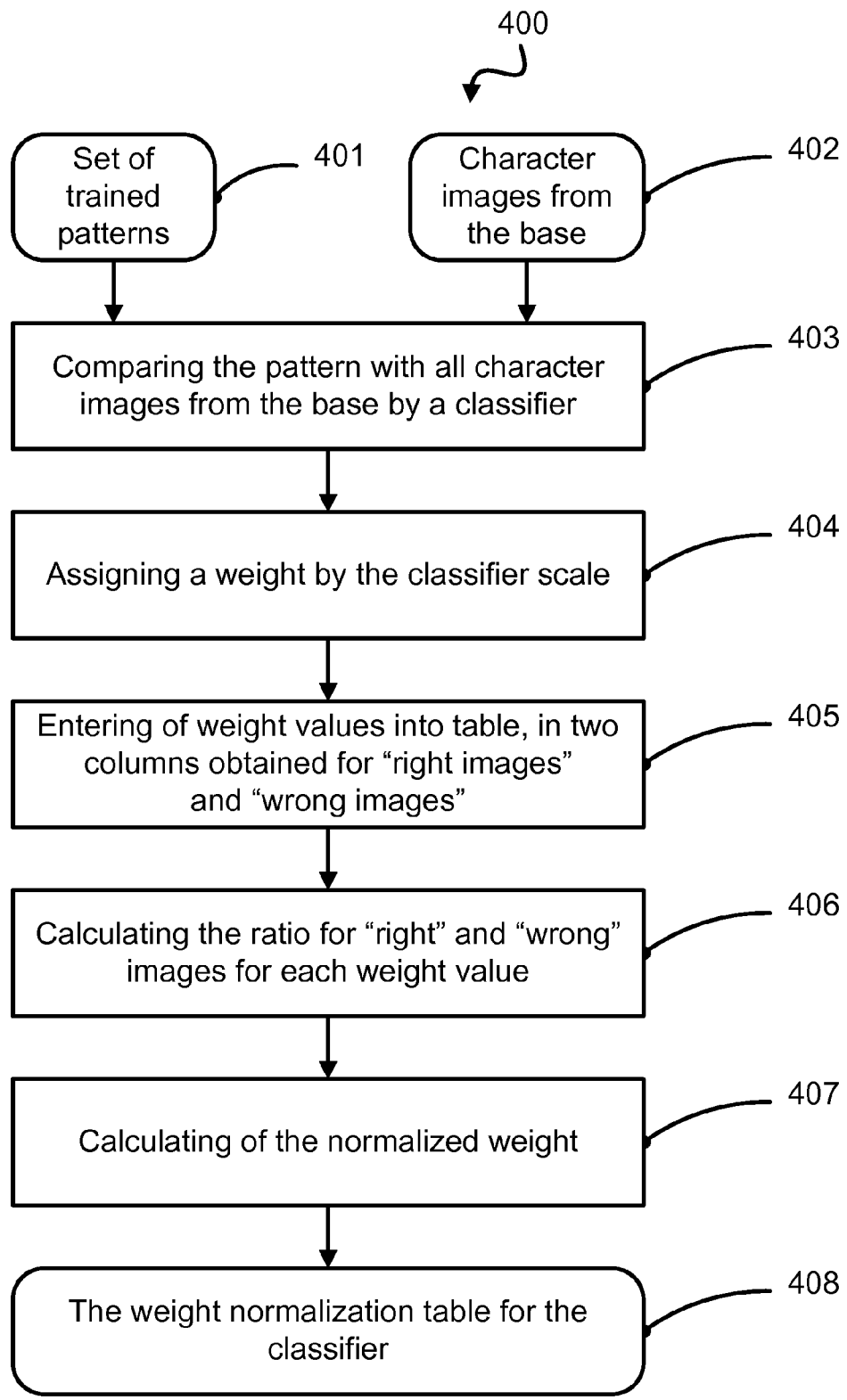
FIG. 4 shows a flowchart of a method for training a weight normalization table for an individual character pattern, in accordance with an embodiment of the present disclosure.

Referring now to FIG. 4, a flowchart of a method for training a weight normalization table of an individual character pattern for one of classifiers is shown, in accordance with an embodiment of the present disclosure by means of module 300 of the FIG. 3. Specifically, a set 401 of trained patterns (301) of all possible characters from the database and character images 402 from the database 302 are compared by the classifier at the step 403 using the comparator 303. Specifically, the pattern of the character is compared with the images of the right character and all images of the wrong characters and assesses the degree of discrepancy between the character pattern and each of the character images, assigning 404 a weight to each image according to its own scale. All the weight values that were obtained when recognizing the images (402) from the database are entered 405 into the table having two columns: one column includes the weights obtained by comparing the patterns with the images of the right character and the other column for those that were obtained by comparing the patterns with the images of the wrong characters. At the training recognition stage, the "right" characters are known in advance.

Next, at the step 406 for each weight value (q) according to the classifier scale in both columns (for right and wrong images) of the table, the number of image samples with weight less than or equal to (q) is calculated. More specifically the number of image samples with weight less than or equal to (q) is calculated for the "right" images (m) and for the "wrong" images (k). Subsequently, a normalized weight (p) is calculated (407), where $$p = \frac{k}{m+k}.$$

The normalized weight p shows the likelihood that the character with this weight had been recognized incorrectly, the degree of discrepancy between the character image and the pattern. From these correspondences between the normalized weights and weight values on the classifier's own scale, the weight normalization table 408 is built. The weight normalization table 408 is built separately for each type of character. Thus, the procedure 400 is repeated on all character patterns for each type of classifier.

Building a table as shown in the procedure 400 for each character pattern takes account of the fact that the same weight given by the same classifier to different characters may mean different things, whereas the normalized weight (e.g. 0.43) means roughly the same for character A as for character B. Advantageously, if this normalization approach is used, the operational principles of classifiers and their scales become irrelevant. The training normalization table in this way requires a large training database of images to reach a sufficient accuracy of the recognition. This is a universal approach which is used to normalize combined classifiers or combinations of classifiers.

In another embodiment, if it is more convenient to have a lower normalized weight corresponding to an image that matches the pattern more poorly than others, the following formula can be used for normalization:

$$p = \frac{k}{m+k}.$$

Figure 6:
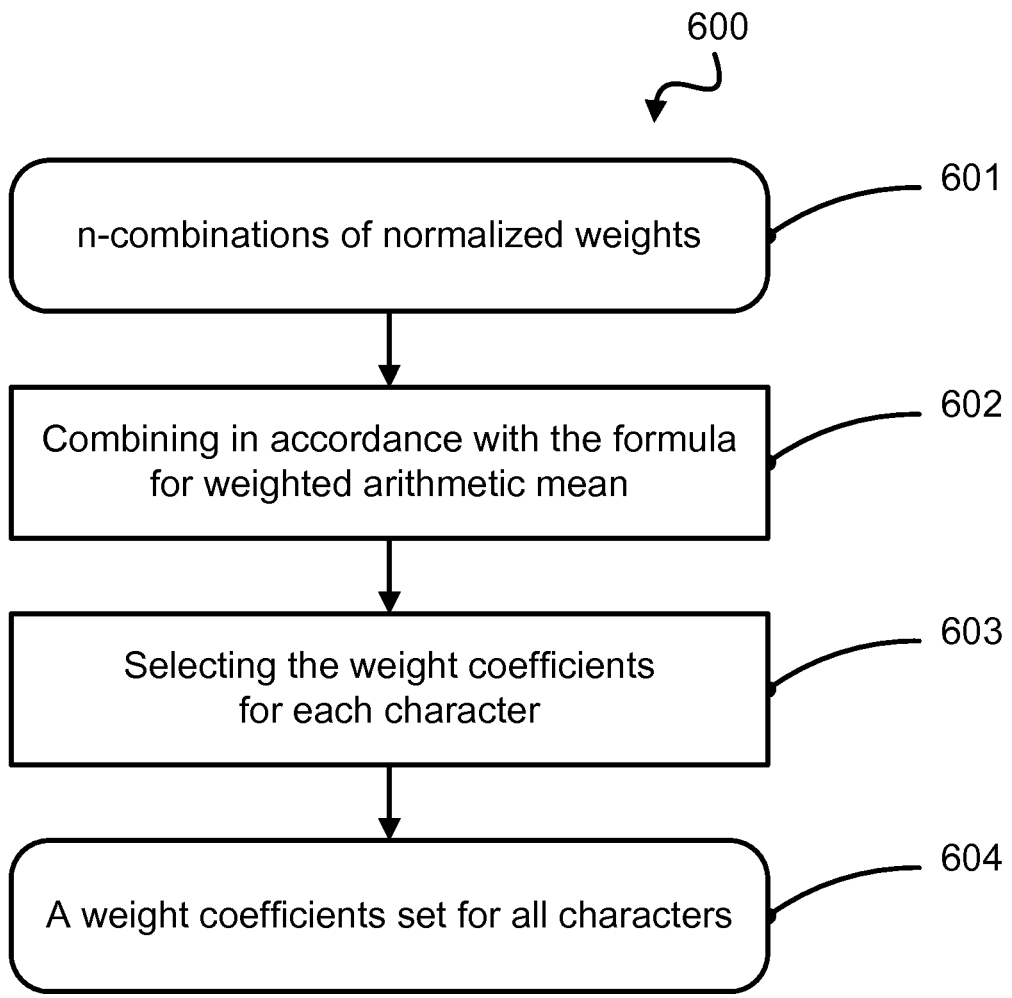
FIG. 6 shows a flowchart of a method of training in a first stage of combining classifiers, in accordance with an embodiment of the present disclosure.
Figure 7:
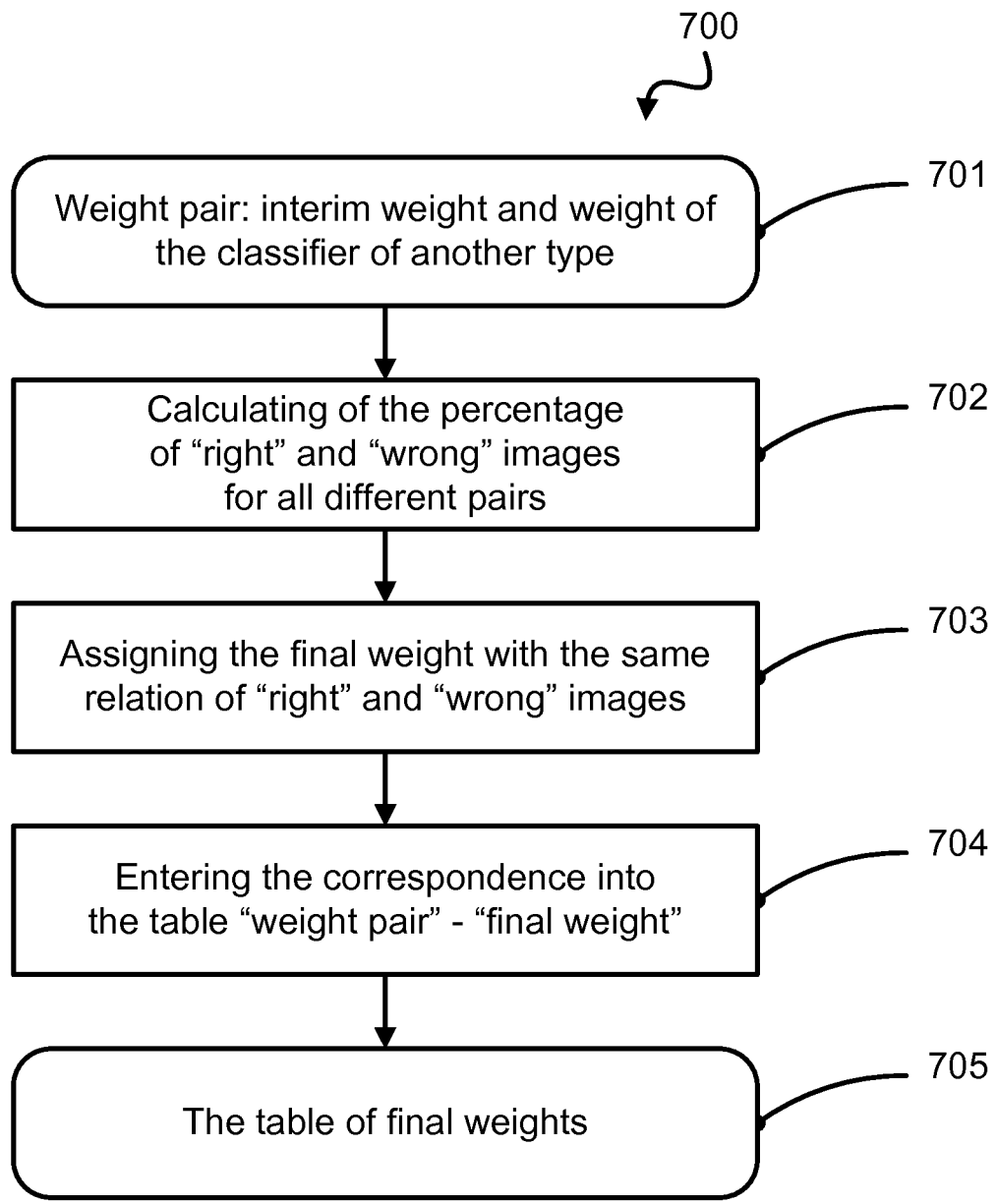
FIG. 7 shows a flowchart of a method of training in a second stage of combining classifiers, in accordance with an embodiment of the present disclosure.

Next, a process of combining the classifiers starts. The combining may be carried out in one or two stages, viz., stages 1 and 2, depending on properties of the classifiers to be combined. FIG. 6 shows the steps associated with an exemplary stage 1, and FIG. 7 shows the steps associated with an exemplary stage 2.

At stage 1, shown in FIG. 6, all or a part of the classifiers are combined in accordance with a formula for a weighted arithmetic mean. At stage 2, shown in FIG. 7, the interim weight is combined with the weight of the remaining (or one of the remaining) classifiers. If all classifiers were combined in one interim weight at stage 1, the combining ends at stage 1, and the process 600 would be complete. Since classifiers of different types may fundamentally differ, a two-stage combining method is used in a recognition system to take advantage of different types of classifiers. Sometimes weights given by various types of classifiers are essentially different, and combining them together in accordance with the formula for the weighted arithmetic mean is not very efficient. Thus, classifiers of the same types are grouped and combined at stage 1 (e.g., the process 600 shown in FIG. 6), and then at stage 2 interim weights calculated at stage 1 are pairwise combined with remaining classifiers (which were not combined at stage 1). Grouping of classifiers may be performed in a variety of ways. For example, based on classifier type, nearest neighbor classifiers may be grouped. Combining may be implemented by means of any combination of stages 1 and 2.

Figure 5A:
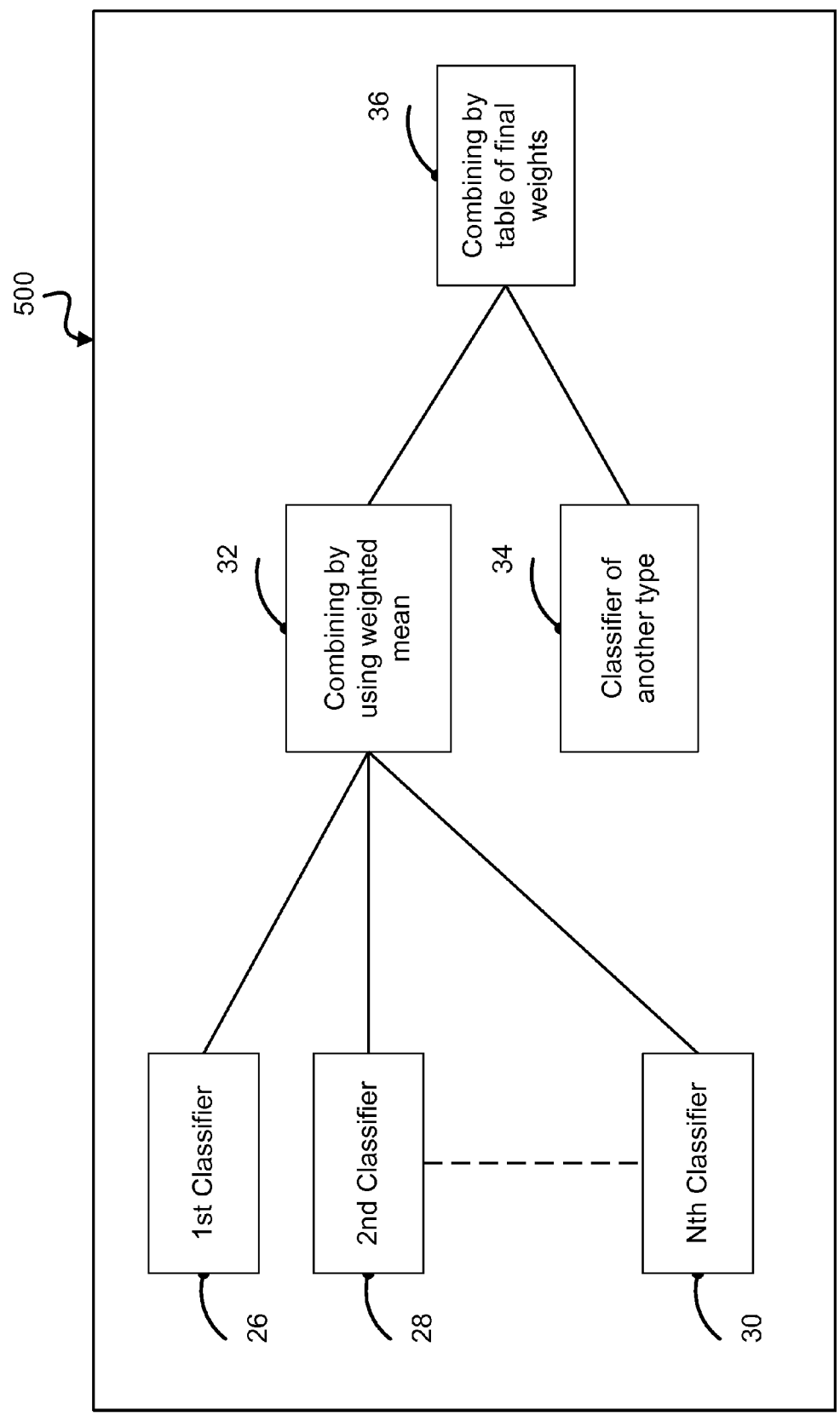
FIG. 5A, FIG. 5B and FIG. 5C show block diagram illustrating different variants of combining a plurality of classifiers in an optical character recognition (OCR) system, in accordance with an embodiment of the present disclosure.
Figure 5B:
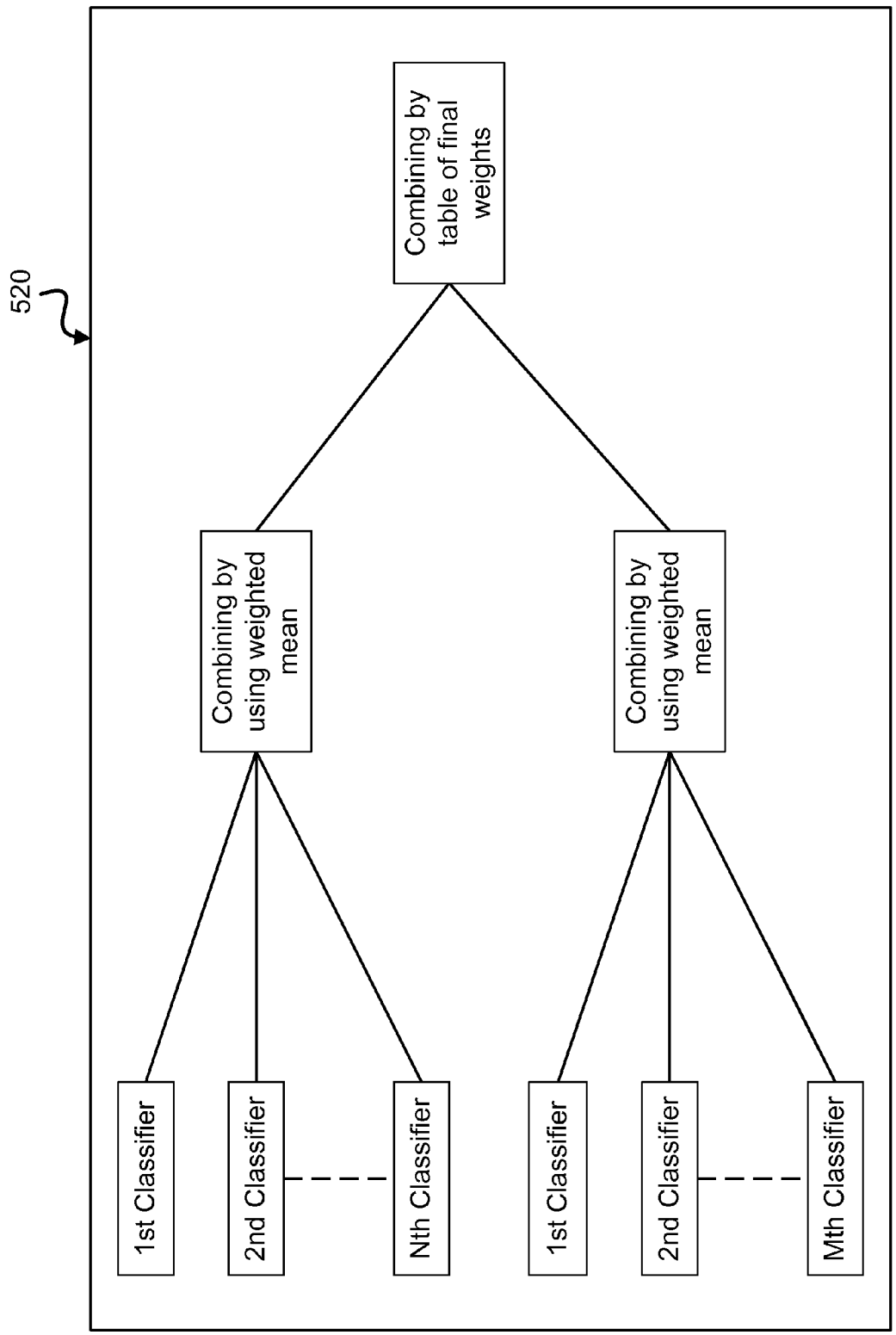
Figure 5C:
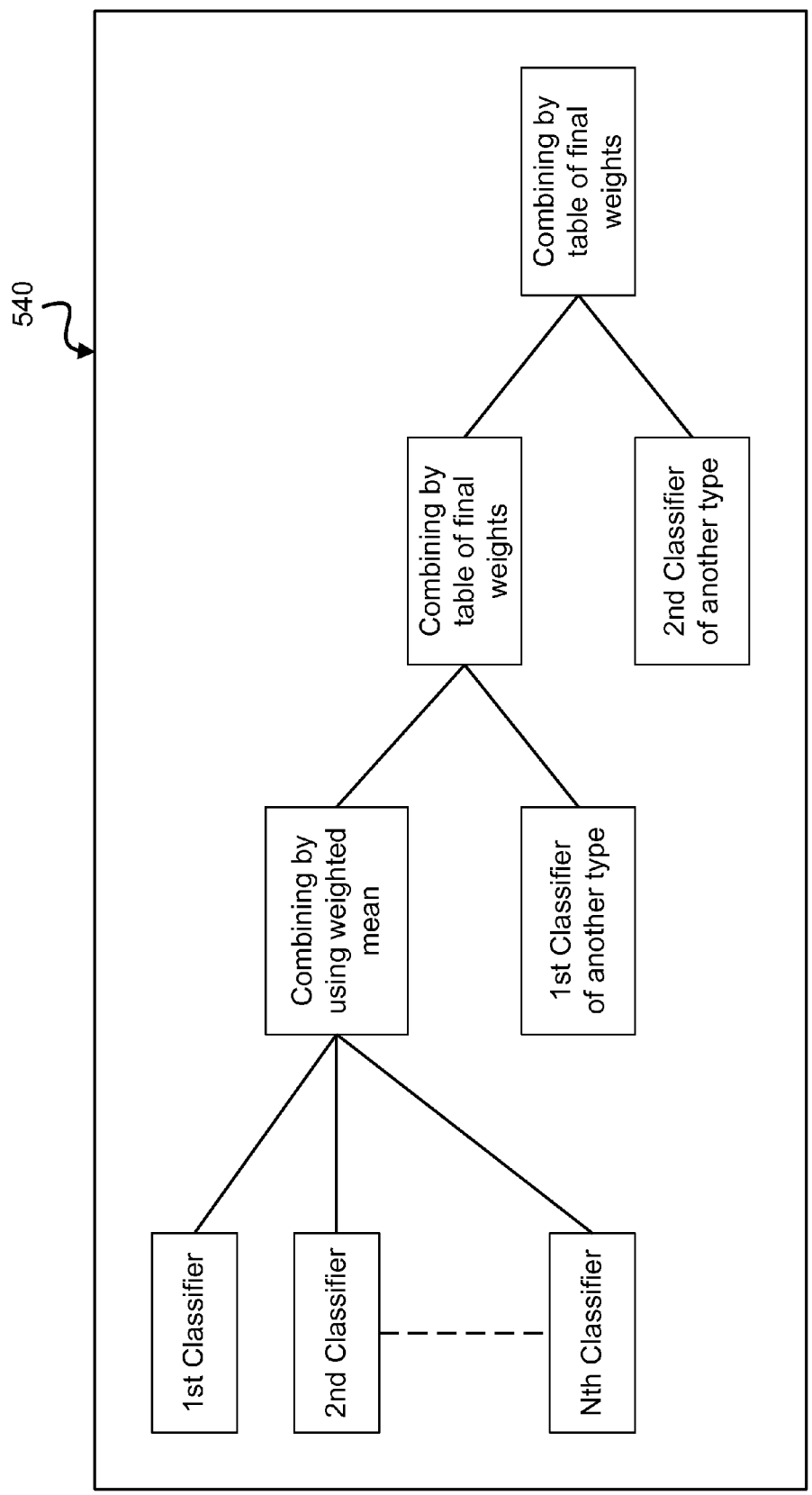

Referring now to FIG. 5A, 5B and 5C, block diagrams illustrate some variations of combining a plurality of classifiers in an optical character recognition (OCR) system in accordance with an embodiment of the present disclosure.

FIG. 5A shows an OCR system 500 including a plurality of classifiers of a same type such as a first classifier 26, a second classifier 28, and so forth up to an Nth classifier 30 and a classifier of another type 34. At stage 1, outputs of the plurality of classifiers (from 26 to 30) are combined by using a weighted mean at step 32. Then at stage 2, output of combining classifiers and output of a classifier of another type 34 are combined by using a table of final weights at step 36. The classifiers are combined such that the OCR system 500 may benefit from the combination of the plurality of classifiers 26-30 and 34.

FIG. 5B shows the OCR system 520 with two classifier groups where both groups are combined by using a weighted mean. Then, both outputs of the combining classifiers are combined by using a table of final weights.

FIG. 5C show the OCR system 540 with one classifier group and two essentially or substantially different classifiers. Classifiers in the group are combined by using a weighted mean; further output of combining classifiers and output of a first classifier of another type are combined by using a table of final weights. Then, output of the latest combining of classifiers and output of a second classifier of another type are combined by using a table of final weights.

Referring now to FIG. 6, for stage 1 combination, according to one embodiment, for all character images in the image database, n-combinations 601 of normalized weights $(x_1, x_2, \ldots, x_n)$ are obtained, which is briefly termed as n-combinations below, where each weight corresponds to the rating given by one of the n classifiers. All the weight values for each type of character are also divided into two categories: n-combinations obtained for the "right" character images, and n-combinations obtained for the "wrong" images.

The combining 602 is done in accordance with the formula for a weighted mean (arithmetic mean with weights) $x = a_1 x_1 + a_2 x_2 + \ldots + a_n x_n$. The weight coefficients $a_1, a_2, \ldots, a_n$ are selected 603 experimentally separately for each character so that the given weighted mean can best separate the images of the right characters from all others characters.

If $x_{ji}$ is the set of all weights (for one character j) obtained as a result of training for the "right" character images, then the best combined weight $$x_j = \sum_{i=1}^{n} a_i x_{ji}$$

is the one that is closest to 0. If $y_{ji}$ is the set of all weights (for the same character j) obtained for the "wrong" images, then the best combined weight $$y_j = \sum_{i=1}^{n} a_i y_{ji}$$

is the one closest to 1. For all $x_j$'s and $y_j$'s a general function is used. The function should have an extremum when $x_j$ are closest to 0 and $y_j$ are closest to 1. An example of such a function, in one embodiment of the invention, is $$f = \sum_j x_j^2 + \sum_j (1-y_j)^2,$$

whose minimum meets the above criteria. Therefore the weight coefficients $a_i$ are selected so that $f \to \min$. In other embodiments of the invention, any other convenient functions may be used. The minimum (or maximum) of the applied function is computed by applying the gradient descent method. This procedure is repeated for each character, while the function type remains unchanged. In other words, finding the weight coefficients $a_i$ is turned into building a hyperplane $f$ in n-dimensional space that (=hyperplane) separates the "right" character images from the "wrong" images. In this manner, for each character, a set of weight coefficients $a_i$ are computed in the course of training 604.

When using a different normalizing method, the coefficients are selected in the same manner. If all classifiers were combined at this stage, the weight x is the final combined weight. Otherwise, the weight x is used as the interim weight at stage 2.

Referring now to FIG. 7 to understand combination of classifiers in stage 2. In stage 2, for all the characters, weight pairs (x, $x_{n+1}$) 701 can be obtained, where $x_{n+1}$ is a weight of a classifier of another type, which did not join in combining of first stage. Every character pattern is compared by the classifier with every character image from the training image database to obtain the weight $x_{n+1}$. Weight x for the same composition of the image and pattern for current character was obtained at stage 1. All the weight values of the weight pairs for each character are also divided into two categories. A first category comprises pairs obtained for the "right" images and second category comprises pairs obtained for the "wrong" images. For each weight pair, a percentage of "right" and "wrong" images is calculated 702 that received the weight pair. For each combination of interim and a weight of another classifier (x, $x_{n+1}$) the final weight w is selected 703 so that the combination of weights (w, w) has the same percentage of "right" and "wrong" images as the combination (x, $x_{n+1}$). The resulting correspondences (x, $x_{n+1}$)—w are entered 704 into the table. In the case of rare pairs (x, $x_{n+1}$) the neighboring weight pairs may be used to calculate the final weight w. The training process 700 results in the table 705 of final weights. Once the training is complete, the combined classifier rating of a character is obtained by performing the steps shown in FIG. 1.

Referring now FIG. 1, a flowchart of a method of obtaining a combined weight of classifiers after the training is shown, in accordance with an embodiment of the present disclosure. Now, after at stage of recognition when the training of combining is complete the right character pattern of the recognized image is unknown and it is determined by OCR system as result of the recognition. Specifically, each of the classifiers compares the character 101 with all the available types of patterns at step 102 and assesses a degree of discrepancy between the image and the pattern, assigning a weight to each pattern at step 103. The weights are then normalized 104 by means of the weight normalization tables, built on all character types for each classifier. The normalized weights assigned to the character by all classifiers (which take part in combining of first stage) when comparing it with the patterns of the same character are n-combinations 105 of the normalized weights for the given character type. Next, all n-combinations of weights are combined 106 into one weight x in accordance with the formula: $x=a_1x_1+a_2x_2+\ldots+a_nx_n$, where $a_1, a_2, \ldots, a_n$ are the coefficients that were selected during the training stage, each type of character having its own coefficients. Next, if the set of classifiers included a classifier of another type, which was not combined (e.g. a structure classifier), for each pair (x, $x_{n+1}$) its combined weight w is selected 107 from the table. Thus a character is compared with every available pattern and is given a combined weight 108 by a combination of classifiers.

OCR systems often use classifiers of different degrees of complexity. For those that are simple and fast, they can easy identify some or the most appropriate variants during recognition, but they can often be mistaken in choosing the correct variant among a collection of most probable or best variants. Others classifiers are complex in implementation and work slowly, but they work accurately and make a minimum of mistakes. For such combined systems it is reasonable at first to combine weights from the simple classifiers (with each other), and to select the best variants of recognition for each image being recognized according to this combined weight. Then, slow complex classifiers (one or more) may be applied, and the image (character, word, etc.) being recognized may be compared at stage 102 with only some of the most appropriate patterns which were selected in a previous stage. Using such a method allows an appreciably reduced time to recognize images in this way. The weights provided by the complex classifiers may be combined only among themselves, or their combined weight may be combined in the way 700 with a combined weight provided by simple classifiers.

Figure 8:
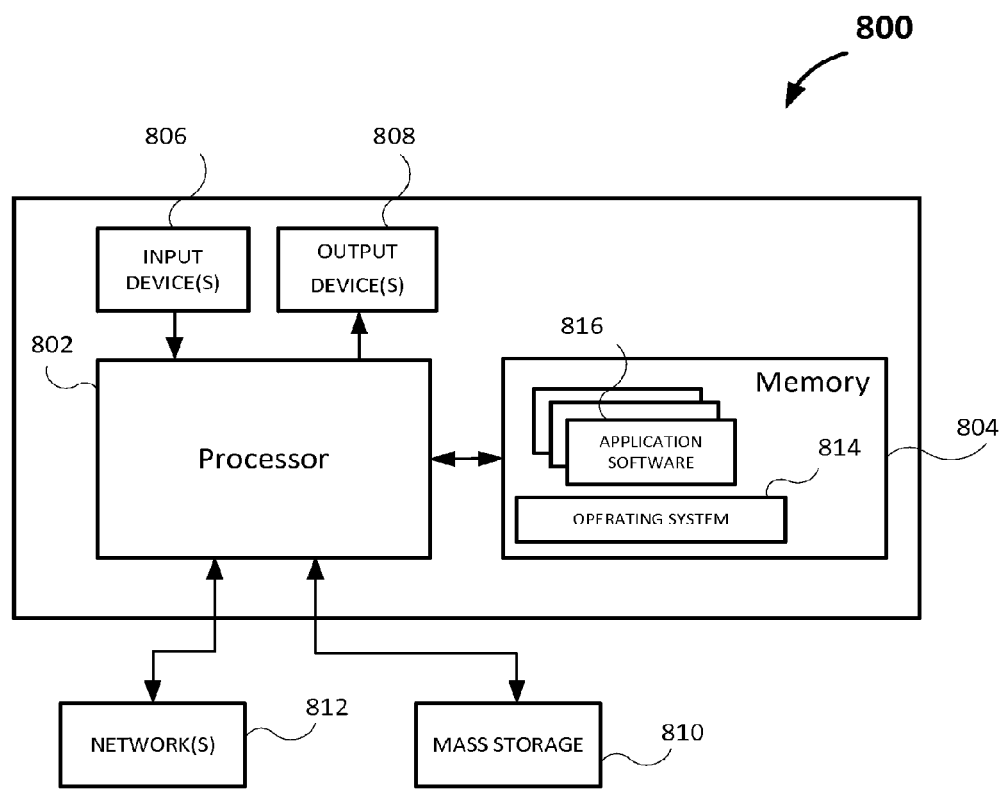
FIG. 8 shows an example of hardware that may be used to implement the techniques disclosed herein, in accordance with an embodiment of the present disclosure.

Referring now to FIG. 8, an example of hardware 800 that may be used to implement the techniques disclosed herein is shown, in accordance with an embodiment of the present disclosure. The hardware 800 typically includes at least one processor 802 coupled to a memory 804. The processor 802 may represent one or more processors (e.g., microprocessors), and the memory 804 may represent random access memory (RAM) devices comprising a main storage of the hardware 800, as well as any supplemental levels of memory e.g., cache memories, non-volatile or back-up memories (e.g. programmable or flash memories), read-only memories, etc. In addition, the memory 804 may be considered to include memory storage physically located elsewhere in the hardware 800, e.g. any cache memory in the processor 802, as well as any storage capacity used as a virtual memory, e.g., as stored on a mass storage device 810.

The hardware 800 also typically receives a number of inputs and outputs for communicating information externally. For interface with a user or operator, the hardware 800 may include one or more user input devices 806 (e.g., a keyboard, a mouse, a scanner etc.) and a display 808 (e.g., a Liquid Crystal Display (LCD) panel). For additional storage, the hardware 800 may also include one or more mass storage devices 810, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 800 may include an interface with one or more networks 812 (e.g., a local area network (LAN), a wide area network (WAN), a wireless network, and/or the Internet among others) to permit the communication of information with other computers coupled to the networks. It should be appreciated that the hardware 800 typically includes suitable analog and/or digital interfaces between the processor 802 and each of the components 804, 806, 808 and 812 as is well known in the art.

The hardware 800 operates under the control of an operating system 814, and executes various computer software applications, components, programs, objects, modules, etc. indicated collectively by reference numeral 816 to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

We claim:

1. A method for training an optical character recognition (OCR) system for a character pattern, the method comprising:
    comparing the character pattern to images of the same character, wherein the images are associated with a database of character images;
    comparing the character pattern to images of different characters associated with the database of character images;
    calculating a weight value for a first classifier for an image sample of the same character based on comparing the character pattern to images of the same character;
    calculating a weight value for the first classifier for an image sample of a different character based on comparing the character pattern to images of the different characters;
    calculating a weight value for a second classifier for an image sample of the same character based on comparing the character pattern to images of the same character;
    calculating a weight value for the second classifier for an image sample of a different character based on comparing the character pattern to images of the different characters;
    for each weight value for the first classifier, calculating a corresponding normalized weight for the first classifier, based on a correlation between same character and different character samples of characters which received a same weight value by comparing the said calculated character pattern weight values;
    for each weight value for the second classifier, calculating a corresponding normalized weight for the second classifier, based on a correlation between same character and different character samples of characters which received a same weight value by comparing the said calculated character pattern weight value;
    calculating corresponding normalized weight values; and
    combining the normalized weight values for the first classifier with those normalized weight values associated with the second classifier.

2. The method of claim 1, wherein the method further comprises:
    repeating for other image samples said calculating the weight value for the image sample of the same character based on comparing the character pattern to images of the same character; and
    repeating for other image samples said calculating the weight value for the image sample of the different characters based on comparing the character pattern to images of the different characters.

3. The method of claim 1, wherein calculating a corresponding normalized weight for each weight value includes creating a weight normalization data structure.

4. The method of claim 1, wherein the method is repeated for each character pattern used by the OCR system.

5. The method of claim 1, wherein the method is repeated for each type of classifier used by the OCR system.

6. The method of claim 1, wherein calculating the weight value for each image sample includes applying a modifier based on a scale associated with a classifier.

7. The method of claim 1, wherein the first classifier and the second classifier are a set of nearest neighbor classifiers.

8. The method of claim 1, wherein calculating weight values comprises:
    creating a data structure with a first portion assigned to weight values that correspond to images of the same character and another portion assigned to weight values that correspond to images of the different characters.

9. The method of claim 8, wherein the method further comprises:
    for each weight value, determining a number of image samples with a weight equal to or better than a corresponding weight value from the first portion and from the other portion; and
    wherein calculating corresponding normalized weight is based on a function, wherein the function includes use of a formula that is substantially proportional to a ratio of the number of samples of different characters to a sum of samples of different and same characters.

10. An electronic device for training an optical character recognition (OCR) classifier, the device comprising:
    a processor;
    a memory in electronic communication with the processor, the memory configured with instructions that cause the electronic device to:
        compare a character pattern to images of the same character, wherein the images of the same character are part of a collection of character images;
        compare the character pattern to images of different characters, wherein the images of the different characters are part of a collection of character images;
        calculate a weight value for an image sample of the same character based on comparing the character pattern to images of the same character;
        calculate a weight value for an image sample of a different character based on comparing the character pattern to images of the different character;
        for each weight value, calculate a corresponding normalized weight, based on a correlation between same character samples and different character samples for the character samples that received a same weight value by comparing the said calculated character pattern weight values; and
        store in said memory said normalized weights for use by the OCR classifier.

11. The electronic device of claim 10, wherein the instructions further cause the electronic device to:
    repeat for other image samples said calculating the weight value for the image sample of the same character based on comparing the character pattern to images of the same character; and
    repeat for other image samples said calculating the weight value for the image sample of the different character based on comparing the character pattern to images of the different characters.

12. The electronic device of claim 10, wherein calculating weight values includes:
    creating a data structure with a first portion assigned to weight values that correspond to images of the same character and another portion assigned to weight values that correspond to images of the different characters.

13. The electronic device of claim 10, wherein calculating the weight value for each image sample includes applying a modifier based on a scale associated with the OCR classifier.

14. The electronic device of claim 10, wherein calculating the weight values for the image sample is associated with a first classifier, and wherein the instructions further cause the electronic device to:
    calculate weight values for a second classifier;
    calculate corresponding normalized weight values; and
    combine the normalized weight values for the first classifier with those normalized weight values associated with the second classifier, wherein the first classifier and the second classifier are a set of nearest neighbor classifiers.

15. One or more physical computer-accessible media encoded with instructions for performing a method, the method comprising:
    comparing a character pattern to images of the same character, wherein the images of the same character are part of a collection of character images;
    comparing the character pattern to images of different characters, wherein the images of the different characters are part of a collection of character images;
    calculating a weight value for an image sample of the same character based on comparing the character pattern to images of the same character;
    calculating a weight value for an image sample of a different character based on comparing the character pattern to images of the different characters;
    for each weight value, calculating a corresponding normalized weight, based on a correlation between same character samples and different character samples for the character samples that received a same weight value by comparing the said calculated character pattern weight values; and
    storing in a computer-accessible memory said normalized weights for use by the OCR classifier.

16. The one or more physical computer-accessible media of claim 15, wherein the method further comprises:
    repeating for other image samples said calculating the weight value for the image sample of the same character based on comparing the character pattern to images of the same character; and
    repeating for other image samples said calculating the weight value for the image sample of the different character based on comparing the character pattern to images of the different characters.

17. The one or more physical computer-accessible media of claim 15, wherein calculating weight values includes:
    creating a data structure with a first portion assigned to weight values that correspond to images of the same character and another portion assigned to weight values that correspond to images of the different characters.

18. The one or more physical computer-accessible media of claim 15, wherein calculating the weight value for each image sample includes applying a modifier based on a scale associated with the OCR classifier.

19. The one or more physical computer-accessible media of claim 15, wherein calculating the weight values for the image sample is associated with a first classifier, and wherein the method further comprises:
    calculating weight values for a second classifier;
    calculating corresponding normalized weight values; and
    combining the normalized weight values for the first classifier with those normalized weight values associated with the second classifier, wherein the first classifier and the second classifier are a set of nearest neighbor classifiers.

* * * * *